Sept. 28, 1948.   A. M. STANLEY   2,450,259
AIRCRAFT WHEEL AND TIRE
Filed Nov. 11, 1944
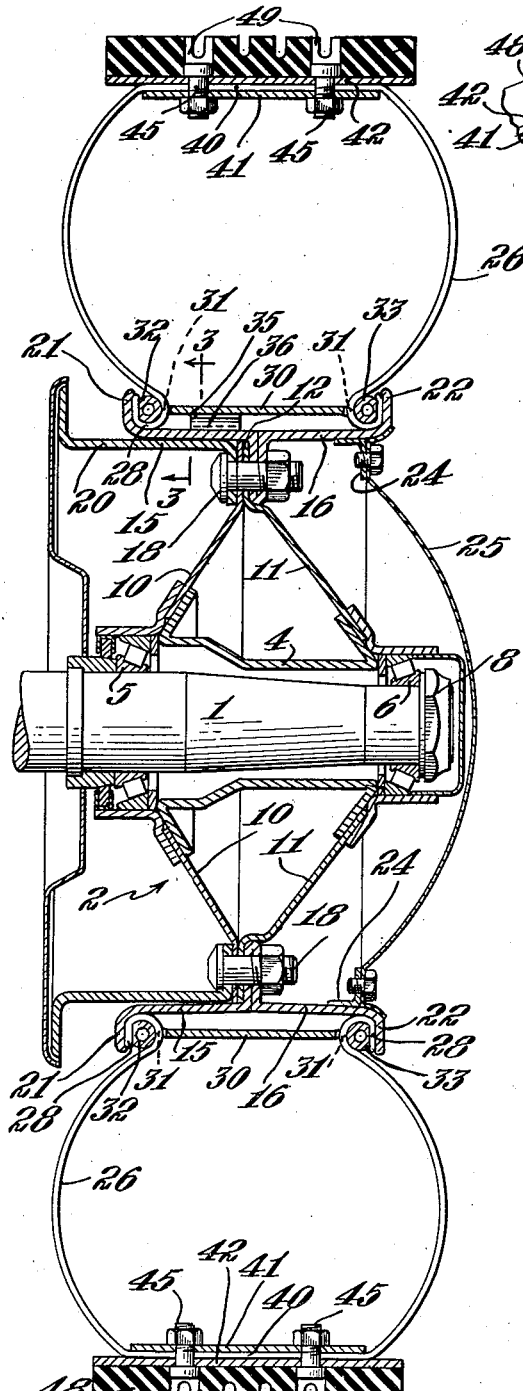
Fig. 1
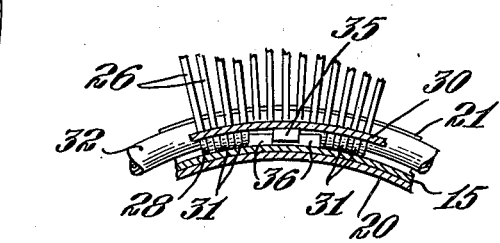
Fig. 2
Fig. 3
Inventor
Arthur M. Stanley
by Roberts, Cushman & Grover
attys Patented Sept. 28, 1948

2,450,259

UNITED STATES PATENT OFFICE 2,450,259

AIRCRAFT WHEEL AND TIRE

Arthur M. Stanley, Lynn, Mass.

Application November 11, 1944, Serial No. 563,001

5 Claims. (Cl. 152—84)

This invention relates to a tire and wheel construction particularly suitable for use in aircraft and the like vehicles which subject the tires and wheels to severe impacts and strains.

The principal objects of the invention are to provide a tire and wheel assembly which possesses the resiliency and desirable features of a pneumatic tire construction, but which is not subject to punctures and blow-outs, to provide a tire capable of absorbing impacts and transmitting strains throughout the entire periphery of the wheel, and to provide a construction which is of relatively light weight and which may be manufactured more economically than conventional constructions.

Other objects are to provide a complete tire and wheel assembly including a brake drum, which may be quickly mounted and readily detached from an axle, and to provide a construction which permits the tire and/or tread element to be replaced when necessary without disturbing the wheel proper.

Further objects relate to various features of construction and will be apparent from a consideration of the following description.

In accordance with the present invention, the wheel construction comprises an axle mounting and associated spokes or disks for supporting an annular rim member formed along its edges with flanges providing inner and outer circumferential recesses. A plurality of radially extending circumferentially spaced resilient U-shaped loop members are mounted on the rim so as collectively to define a toroidal shaped tire member, and the ends of the loops are outwardly curved collectively to provide, in effect, beaded edges which fit within the circumferential recesses or otherwise provide an interlock between the parts. A spreader ring, formed along its edges with spaced lugs or the like serrations is circumposed about the rim member with the lugs projection between the curved ends of the loop members so as to lock them in properly spaced position within the recesses. In order to prevent relative rotation between the rim and ring members, interlocking lugs or the like are provided, and, if desired, bead rings or the like may be inserted within the curved ends of the loop members so as to cooperate with the spreader ring in locking the parts in position. Inner and outer circumferential rings are disposed on opposite side of the outer peripheral portions of the looped members, and one of these rings is formed with transversely extending corrugations or the like projections providing spaced grooves which receive the outer peripheral portion or closed ends of the loop members, the construction and arrangement of parts preferably being such that the circumferential rings and outer periphery of the tire are resiliently deformable and yieldable when subjected to impacts, but resistant to permanent deformation, due to the aforesaid flexibility of resiliency of the circumferential rings which distribute the shocks and strains so that all spring elements are brought into action, thereby absorbing the shocks from any direction. Bolts, rivets or other suitable means are provided rigidly to secure the circumferential rings together so as firmly to clamp the looping members therebetween. A strip of rubber or other suitable material is mounted on and bonded to the outer circumferential ring to provide a tread member, and a brake drum may be welded or otherwise secured to the inner marginal portion of the inner half rim which is an integral part of the wheel.

In the accompanying drawings which show what is now considered a preferred embodiment Fig. 1 is a diametrical section at right angles to the axis through the wheel and tire assembly;

Fig. 2 is a fragmentary side elevation with parts broken away and shown in section; and Fig. 3 is a section on the line 3—3 of Fig. 1.

Referring to Fig. 1, the numeral 1 designates an axle which rotatably supports a mounting 2 comprising a hub member 4 having inner and outer roller bearings 5 and 6, the hub and associated parts being held on the axle by a nut 8. The spaced inner ends of disks 10 and 11 are welded or otherwise secured to the hub 4 and their peripheries converge to provide an attaching flange 12. The inwardly directed flanges of a divided rim member comprising inner and outer half rims 15 and 16 are secured to the attaching flange 12 by bolts 18, and a brake drum 20 for an expanding brake (not shown) is welded to the inner periphery of the rim 15. The longitudinal edges of the rims 15 and 16 are formed with flanges 21 and 22 having inwardly bent ends so as to provide circumferential recesses, and inwardly projecting lugs 24 are secured at spaced points to the outer rim 16 to which a hub cap 25 is bolted.

A plurality of circumferentially spaced U-shaped loops 26 of spring steel or the like resilient metal are mounted on the rim, the free ends 28 of the groups being shaped so as snugly to fit within the circumferential recesses defined by the flanges 21 and 22, the closed ends of the loops being radially disposed, as shown in Fig. 2, to provide, in effect, a toroidal shaped tire member. A split spreader ring 30 is circumposed about the rim member and its ends are welded together.

The longitudinal edges of the spreader ring 30 are formed with lugs or serrations 31 (Figs. 1 and 3) which project between the curved ends 28 of the loops so as to maintain the loop ends in properly spaced relation and cooperate with a pair of bead rings 32 and 33 to lock them within the recesses. The under-surface of the spreader ring 30 is provided with an abutment or lug 35 which is received in the space between similar lugs 36 welded or otherwise secured to the outer face of the inner half rim 15 (Fig. 3), thus providing interengaging parts which prevent relative rotation of the rim and spreader ring.

The outer peripheral portion or closed ends 40 of the loop 26 are flattened, as shown in Fig. 1, and inner and outer circumferential rings 41 and 42 are disposed on opposite sides of the ends 40. The inner ring 41 is formed with transverse corrugations which provide spaced recesses 44 which receive the closed ends 40 of the loops, as shown in Fig. 2, and the rings 41 and 42 are rigidly secured together by bolts 45, thus firmly clamping the closed ends 40 in properly spaced position. A rubber tread member 48 is cemented or otherwise secured to the outer ring 42, and is formed with spaced openings 49 to receive the heads of the bolts 45, as shown in Fig. 1. If desired, a covering of fabric or other flexible material may be fitted about the loops 26 to prevent the entry of foreign matter.

The tire and wheel construction may be assembled as follows:

The inner circumferential ring 41 and bead rings 32 and 33 are first placed on a suitable assembly fixture, after which the loops 26 are applied over the link 41 with their flat closed ends in the grooves 44 and their free ends 28 are bent at approximately right angles about the rings 32, 33. The split spreader ring 30 is next inserted wtihin the loops so that its lugs 31 project between the ends 28 of the loops, and thereafter the contiguous ends of the split ring 30 are arc welded together. The lugs 31 and ends 28 are then bent or curled about the bead rings 32, 33, as illustrated in Figs. 1 and 3. The outer circumferential ring 42 with its tread 48 vulcanized to its outer face is first heated and while hot is then slipped over the assembled loops and inner circumferential ring so that the bolt openings in the rings register. While the parts are cooling, the bolts 45 may be applied and after cooling the bolts are tightened, thus securely clamping the parts together and completing the assembly of the tire portion. The brake drum 20 is spot welded to the inner half-rim 15, and the rim and brake drum are then applied to the flange 12 of the wheel, after which the loops 26 and associated parts are applied to the inner rim 15 with the lug 35 positioned between the lugs 36. The outer rim 16 may then be applied, the bolts 18 tightened and the cap 25 applied to complete the assembly.

While I have shown and described one embodiment of the invention, it is to be understood that this disclosure is for the purpose of illustration and that various changes and modifications may be made without departing from the spirit and scope of the invention as set forth in the appended claims.

I claim:

1. A vehicle wheel comprising, an annular rim member formed along its edges with curved flanges which provide inner and outer circumferential recesses at the junctions of said flanges and rim, a plurality of radially extending circumferentially spaced approximately U-shaped resilient spring wire members mounted on said rim so as collectively to define a toroidal shaped tire member, each spring wire member having outwardly curved ends fitting within said circumferential recesses, bead rings extending about said rim and fitting within the curved ends of said spring wire members so as to anchor them in said circumferential recesses, a spreader ring circumposed about said rim member and formed along its edges with space lugs projecting between the ends of said spring wire members so as to lock them in properly spaced position, inner and outer circumferential rings disposed on opposite sides of the outer peripheral portion of said spring wire members and rigidly connected together so as to clamp the spring wire members therebetween, and a tread member mounted on the outer circumferential ring.

2. A vehicle wheel comprising, an annular rim member formed along its edges with curved flanges which provide inner and outer circumferential recesses at the junctions of said flanges and rim, a plurality of radially extending circumferentially spaced approximately U-shaped resilient spring wire members mounted on said rim so as collectively to define a toroidal shaped tire member, each spring wire member having outwardly curved ends fitting within said circumferential recesses, bead rings extending about said rim and fitting within the curved ends of said spring wire members so as to anchor them in said circumferential recesses, a spreader ring circumposed about said rim member and formed along its edges with spaced lugs projecting between the ends of said spring wire members so as to lock them in properly spaced position, interengageable means carried by said spreader ring and rim member for preventing relative rotation between the parts, inner and outer circumferential rings disposed on opposite sides of the outer peripheral portion of said spring wire members and rigidly connected together so as to clamp the spring wire members therebetween, and a tread member mounted on the outer circumferential ring.

3. A vehicle wheel comprising, an annular rim member formed along its edges with curved flanges which provide inner and outer circumferential recesses at the junctions of said flanges and rim, a plurality of radially extending circumferentially spaced approximately U-shaped resilient spring wire members mounted on said rim so as collectively to define a toroidal shaped tire member, each spring wire member having outwardly curved ends fitting within said circumferential recesses, bead rings extending about said rim and fitting within the curved ends of said spring wire members so as to anchor them in said circumferential recesses, a spreader ring circumposed about said rim member and formed along its edges with spaced lugs projecting between the ends of said spring wire members so as to lock them in properly spaced position, inner and outer circumferential rings disposed on opposite sides of the outer peripheral portion of said spring wire members, one of said circumferential rings having transversely extending spaced grooves which receive the outer peripheral portion of said spring wire members to retain them in properly spaced position, means rigidly connecting said circumferential rings together so as to clamp the outer peripheral portion of said spring wire members therebetween, and a tread member mounted on the outer circumferential ring.

4. A vehicle wheel comprising, an annular rim member formed along its edges with curved flanges which provide inner and outer circumferential recesses at the junctions of said flanges and rim, a plurality of radially extending circumferentially spaced approximately U-shaped resilient spring wire members mounted on said rim so as collectively to define a toroidal shaped tire member, each spring wire member having outwardly curved ends fitting within said circumferential recesses, bead rings extending about said rim and fitting within the curved ends of said spring wire members so as to anchor them in said circumferential recesses, a spreader ring circumposed about said rim member and formed along its edges with spaced lugs projecting between the ends of said spring wire members so as to lock them in properly spaced position, inner and outer circumferential rings disposed on opposite sides of the outer peripheral portion of said spring wire members, the inner circumferential ring having a transversely corrugated surface which provides spaced recesses receiving the outer peripheral portion of said spring wire members to retain them in properly spaced position, means rigidly connecting said circumferential rings together so as to clamp the outer peripheral portions of said spring wire members therebetween, and a tread member mounted on the outer circumferential ring.

5. A wheel comprising an annular rim having flanges along its edges to provide inner and outer circumferential recesses, a plurality of radially extending circumferentially spaced approximately U-shaped resilient spring wire members mounted on the rim so as collectively to define a toroidal shaped tire, each spring wire member having its ends anchored within said recesses, and a spreader ring circumposed about said rim and having along its edges spacer lugs projecting between the ends of the loops to lock them in said recesses and hold their ends in properly spaced position.

ARTHUR M. STANLEY.

REFERENCES CITED

The following references are of record in the file of this patent:

UNITED STATES PATENTS

| Number | Name | Date |
|---|---|---|
| 843,228 | Murray | Feb. 5, 1907 |
| 965,204 | Magney | July 26, 1910 |
| 1,076,127 | Krikava | Oct. 21, 1913 |
| 1,094,034 | Sturman | Apr. 21, 1914 |
| 1,111,648 | Darr | Sept. 22, 1914 |
| 1,143,461 | Sturman | June 15, 1915 |
| 1,255,767 | Mason | Feb. 5, 1918 |

FOREIGN PATENTS

| Number | Country | Date |
|---|---|---|
| 383,887 | France | Mar. 20, 1908 |